(12) United States Patent
Huang et al.

(10) Patent No.: US 9,927,860 B2
(45) Date of Patent: Mar. 27, 2018

(54) METHOD FOR REDUCING POWER CONSUMPTION OF MEMORY SYSTEM, AND MEMORY CONTROLLER

(71) Applicant: HUAWEI TECHNOLOGIES CO., LTD., Shenzhen, Guangdong (CN)

(72) Inventors: Yongbing Huang, Beijing (CN); Mingyu Chen, Beijing (CN); Yuan Ruan, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 13 days.

(21) Appl. No.: 14/685,272

(22) Filed: Apr. 13, 2015

(65) Prior Publication Data
US 2015/0220135 A1    Aug. 6, 2015

Related U.S. Application Data (63) Continuation of application No. PCT/CN2012/083062, filed on Oct. 17, 2012.

(51) Int. Cl.
*G06F 1/32*     (2006.01)
*G06F 9/50*     (2006.01)
(Continued)

(52) U.S. Cl.
CPC .......... *G06F 1/3225* (2013.01); *G06F 1/3275* (2013.01); *G06F 3/068* (2013.01);
(Continued)

(58) Field of Classification Search
CPC .. G06F 1/3225; G06F 1/3275; G06F 11/3037; G06F 12/00; G06F 12/0638; G06F 9/5016; G06F 9/5094
See application file for complete search history.

(56) References Cited

U.S. PATENT DOCUMENTS

2004/0205318 A1    10/2004    Kimelman et al.
2009/0049234 A1    2/2009    Oh et al.
(Continued)

FOREIGN PATENT DOCUMENTS

CC    102326149 A    1/2012
CN    101369451 A    2/2009
(Continued)

OTHER PUBLICATIONS

Tae Jun Ham et al:"Disintegrated Control for Energy-Efficient and Heterogeneous Memory Systems", 2013, total 12 pages.
(Continued)

*Primary Examiner* — Dennis Butler
(74) *Attorney, Agent, or Firm* — Huawei Technologies Co., Ltd.

(57) ABSTRACT

A method for reducing power consumption of a memory system and a memory controller are provided. The method for reducing power consumption of a memory system includes: determining whether a dynamic random access memory DRAM memory module with a low access frequency exists in a memory system; when a DRAM memory module with a low access frequency exists, transfer, according to a size of a working set in the memory system, page data that does not belong to the working set to a non-volatile memory NVM memory module, where the page data that does not belong to the working set is page data that does not need to be accessed when a process runs within preset time.

14 Claims, 8 Drawing Sheets

Determine whether a DRAM memory module with a low access frequency exists in a memory system — S201

When a DRAM memory module with a low access frequency exists, transfer, according to a size of a working set in the memory system, page data that does not belong to the working set to the NVM memory module — S202

(51) Int. Cl.
*G06F 12/06* (2006.01)
*G06F 3/06* (2006.01)

(52) U.S. Cl.
CPC .......... *G06F 3/0625* (2013.01); *G06F 3/0647* (2013.01); *G06F 9/5094* (2013.01); *G06F 12/0638* (2013.01); G06F 9/5016 (2013.01); G06F 2212/1028 (2013.01); G06F 2212/205 (2013.01); G06F 2212/251 (2013.01); Y02B 60/1225 (2013.01); Y02B 60/1228 (2013.01); Y02B 60/1246 (2013.01); Y02B 60/142 (2013.01); Y02B 60/32 (2013.01)

(56) References Cited

U.S. PATENT DOCUMENTS

| | | |
|---|---|---|
| 2010/0169708 A1 | 7/2010 | Rudelic et al. |
| 2011/0029797 A1 | 2/2011 | Vaden |
| 2011/0093654 A1 | 4/2011 | Roberts et al. |
| 2012/0079232 A1 | 3/2012 | Hinton et al. |
| 2013/0326252 A1* | 12/2013 | Ise .................. G06F 1/3234 713/323 |
| 2014/0052948 A1 | 2/2014 | Qiu et al. |
| 2015/0106582 A1* | 4/2015 | Mai .................. G06F 3/0649 711/165 |

FOREIGN PATENT DOCUMENTS

| | | |
|---|---|---|
| CN | 101770430 A | 7/2010 |
| CN | 104216837 A | 12/2014 |
| WO | 2008055269 A2 | 5/2008 |

OTHER PUBLICATIONS

Luiz Ramos et al: "Page placement in hybrid memory systems", supercomputing, ACM, May 31-Jun. 4, 2011, total 12 pages.
XP32265802, Xiangyong ouyang et al:"SSD-assisted hybrid memory to accelerate memcached over high performance networks", Sep. 10, 2012. total 10 pages.
XP31636186,Yongsoo Joo et al:"demand paging for onenandtm flash execute-in-place", Oct. 22, 2006. total 6 pages.

* cited by examiner

METHOD FOR REDUCING POWER CONSUMPTION OF MEMORY SYSTEM, AND MEMORY CONTROLLER

CROSS-REFERENCE TO RELATED APPLICATIONS

This application is a continuation of International Application No. PCT/CN2012/083062, filed on Oct. 17, 2012, which is hereby incorporated by reference in its entirety.

TECHNICAL FIELD

Embodiments of the present invention relate to computer technologies, and in particular, to a method for reducing power consumption of a memory system, and a memory controller.

BACKGROUND

Currently, computers have become a very important tool in people's daily life, and are broadly applied in various fields. Memory performance is an important technical measurement for measuring performance of a computer. With the development of memory technology, a memory is continuously upgrading; however, compared with the development of the memory, a processor develops more rapidly, and a difference between the two is gradually increasing. Improvement of the process not only brings about improvement of the performance, but also increases an energy efficiency ratio. Therefore, in a whole computer system, a difference between an energy efficiency ratio of a memory system and an energy efficiency ratio of a processor is gradually increasing. According to statistics, power consumption of the memory system accounts for 46% of power consumption of the whole computer system. It can be seen that optimizing the power consumption of the memory system is significant for improving the power consumption of the whole computer system.

The power consumption of the memory system is classified into static power consumption and dynamic power consumption in the terms of composition. The static power consumption refers to power consumption of a memory unit in an idle state, and mainly includes leakage power consumption, refresh power consumption, and the like. The dynamic power consumption refers to power consumption generated when the memory unit is accessed, and includes power consumption of a memory chip, power consumption of a row buffer, power consumption of an I/O gating, and the like.

In the prior art, a method for dynamically adjusting a DRAM (Dynamic Random Access Memory) memory chip by using a memory controller is that, a memory system formed by a whole DRAM chip is divided into two areas: a refresh area and a non-refresh area, and when a memory system switches to a low power consumption mode according to a use condition of a memory, the refresh area is refreshed normally to maintain correctness of data, and the non-refresh area is not refreshed according to a requirement of a DDR (Double Data Rate, double data rate synchronous dynamic random access storage) protocol, so as to reduce refresh power consumption, thereby reducing power consumption of the whole memory system.

In the prior art, a main measure for reducing the power consumption of the memory system is adjusting a refresh frequency, but with such a manner, reduction amplitude of the power consumption of the memory system is not large and an effect on reducing the power consumption of the memory system is not obvious.

SUMMARY

Embodiments of the present invention provide a method for reducing power consumption of a memory system and a memory controller, so as to reduce power consumption of a memory system according to a use condition of the memory system.

In a first aspect, a method for reducing power consumption of a memory system is provided and includes: determining whether a dynamic random access memory DRAM memory module with a low access frequency exists in a memory system; when a DRAM memory module with a low access frequency exists, transferring, according to a size of a working set in the memory system, page data that does not belong to the working set to a non-volatile memory NVM memory module, where the page data that does not belong to the working set is page data that does not need to be accessed when a process runs within preset time.

In a first possible implementation manner, in combination with the first aspect, the transferring, according to a size of a working set in the memory system, page data that does not belong to the working set to an NVM memory module includes: when the size of the working set does not exceed a preset threshold of power consumption adjustment, transferring the page data that does not belong to the working set to the NVM memory module.

In a second possible implementation manner, in combination with the first aspect or the first possible implementation manner of the first aspect, before the transferring, according to a size of a working set in the memory system, page data that does not belong to the working set to an NVM memory module, the method further includes: dividing the DRAM memory module into a high-performance DRAM area and a low-power consumption DRAM area according to the size of the working set; and transferring page data of the working set to the high-performance DRAM area.

In a third possible implementation manner, in combination with the first aspect or the first or second possible implementation manner of the first aspect, the method further includes: recording a location mapping relationship of the page data that does not belong to the working set before and after the transferring in a data location mapping table.

In a fourth possible implementation manner, in combination with the first aspect or the first, second, or third possible implementation manner of the first aspect, before the determining whether a DRAM memory module with a low access frequency exists in a memory system, the method further includes: monitoring a use state of a memory module in the memory system, where the memory module includes the DRAM memory module and the NVM memory module, and the use state of the memory module includes whether the memory module is accessed and an accessed frequency; and the determining whether a DRAM memory module with a low access frequency exists in a memory system includes: determining, according to the accessed frequency, whether the DRAM memory module with a low access frequency exists in the memory system.

In a fifth possible implementation manner, in combination with the first possible implementation manner of the first aspect, a method for determining the preset threshold of power consumption adjustment is: determining a ratio of performance to power consumption of the NVM memory module and a ratio of performance to power consumption of the DRAM memory module; determining an overhead for transferring the page data in the DRAM memory module and the NVM memory module and an overhead for updating a data location mapping table; and determining the preset threshold of power consumption adjustment according to the ratio of performance to power consumption of the NVM memory module, the ratio of performance to power consumption of the DRAM memory module, the overhead for transferring the page data in the DRAM memory module and the NVM memory module, the overhead for updating the data location mapping table, and a memory access requesting mode.

In a second aspect, a method for accessing memory system data is provided and includes: receiving a memory access request of a processor or a cache, where the memory access request includes data that is requested to be accessed; determining whether the data has been transferred from a DRAM memory module to an NVM memory module; when the data has been transferred, acquiring a location of the data in the NVM memory module according to a data location mapping table, where the data location mapping table is used to record a location mapping of the data before and after the transferring; and accessing the data according to the location of the data in the NVM memory module.

In a first possible implementation manner, in combination with the second aspect, after the receiving a memory access request of a processor or a Cache, the method further includes: monitoring a use state of a memory module in a memory system, where the memory module includes the DRAM memory module and the NVM memory module, and the use state of the memory module includes whether the memory module is accessed and an accessed frequency; determining, according to the accessed frequency, whether a DRAM memory module with a low access frequency exists in the memory system; and when a DRAM memory module with a low access frequency exists, transferring the data from the DRAM memory module to the NVM memory module.

In a third aspect, a memory controller is provided and includes: a power consumption adjustment decision module, configured to determine whether a dynamic random access memory DRAM memory module with a low access frequency exists in a memory system; a data transferring module, configured to, when the power consumption adjustment decision module determines that a DRAM memory module with a low access frequency exists, transfer, according to a size of a working set in the memory system, page data that does not belong to the working set to a non-volatile memory NVM memory module, where the page data that does not belong to the working set is page data that does not need to be accessed when a process runs within preset time.

In a first possible implementation manner, in combination with the third aspect, the data transferring module is specifically configured to: when the size of the working set does not exceed a preset threshold of power consumption adjustment, transfer the page data that does not belong to the working set to the NVM memory module.

In a second possible implementation manner, in combination with the third aspect or the first possible implementation manner of the third aspect, the memory controller further includes: a dividing module, configured to divide the DRAM memory module into a high-performance DRAM area and a low-power consumption DRAM area according to the size of the working set; and the data transferring module is further configured to transfer page data of the working set to the high-performance DRAM area.

In a third possible implementation manner, in combination with the third aspect or the first or second possible implementation manner of the third aspect, the memory controller further includes: a memory module state monitor, configured to monitor a use state of a memory module in the memory system, where the memory module includes the DRAM memory module and the NVM memory module, and the use state of the memory module includes whether the memory module is accessed and an accessed frequency; and the power consumption adjustment decision module is specifically configured to determine, according to the accessed frequency, whether the DRAM memory module with a low access frequency exists in the memory system.

In a fourth aspect, a memory controller is provided and includes: a receiving module, configured to receive a memory access request of a processor or a cache Cache, where the memory access request includes data that is requested to be accessed; a determining module, configured to determine whether the data has been transferred from a DRAM memory module to an NVM memory module; an acquiring module, configured to, when the determining module determines that the data has been transferred, acquire a location of the data in the NVM memory module according to a data location mapping table, where the data location mapping table is used to record a location mapping relationship of the data before and after the transferring; and an accessing module, configured to access the data according to the location of the data in the NVM memory module.

In a first possible implementation manner, in combination with the fourth aspect, the memory controller further includes: a memory module state monitor, configured to monitor a use state of a memory module in a memory system, where the memory module includes the DRAM memory module and the NVM memory module, and the use state of the memory module includes whether the memory module is accessed and an accessed frequency; a power consumption adjustment decision module, configured to determine, according to the accessed frequency, whether a DRAM memory module with a low access frequency exists in the memory system; and a data transferring module, configured to, when the power consumption adjustment decision module determines that a DRAM memory module with a low access frequency exists, transfer the data from the DRAM memory module to the NVM memory module.

In a fifth aspect, a computer system is provided and includes: at least one processor, at least one memory controller as described in the foregoing, and a memory system, where the memory system includes a DRAM memory module and an NVM memory module.

With the method for reducing memory power consumption provided in the embodiments of the present invention, when a DRAM memory module with a low access frequency exists in a memory system, page data that does not belong to a working set is transferred to an NVM memory module, and because the NVM memory module has characteristics of non-volatility and low power consumption, transferring a part of data stored in the DRAM memory module to the NVM memory module may reduce power consumption of the whole memory system. At the same time, a hybrid memory system based on a DRAM and an NVM is adopted, properties of different memory materials in the terms of performance and power consumption may be comprehensively complementary, thereby reducing power consumption of the memory system to a maximum extent on the premise of satisfying performance of the memory system.

BRIEF DESCRIPTION OF DRAWINGS

To describe the technical solutions in the embodiments of the present invention more clearly, the following briefly introduces the accompanying drawings required for describing the embodiments

DESCRIPTION OF EMBODIMENTS

To make the objectives, technical solutions, and advantages of the embodiments of the present invention more comprehensible, the following clearly describes the technical solutions in the embodiments of the present invention with reference to the accompanying drawings in the embodiments of the present invention. Apparently, the embodiments to be described are merely a part rather than all of the embodiments of the present invention.

Figure 1:
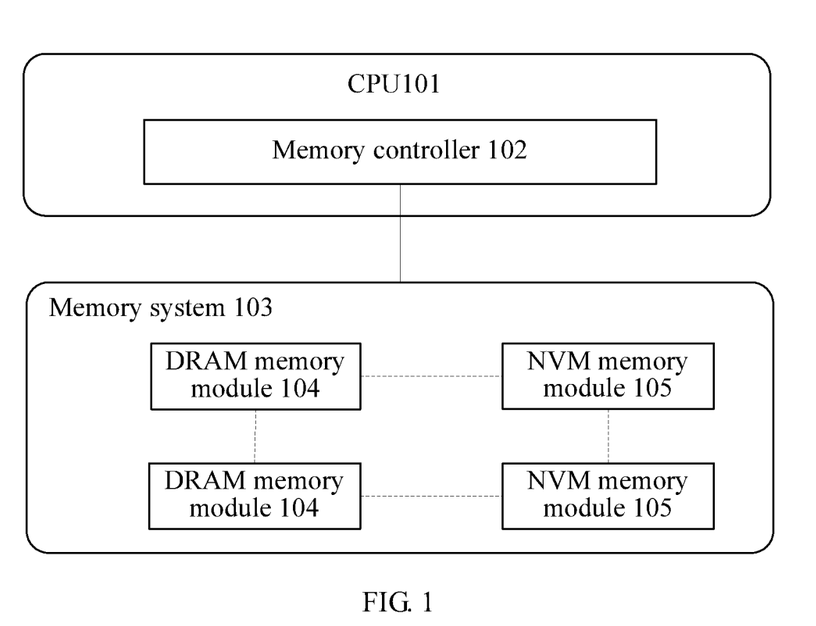
FIG. 1 is a schematic structural diagram of a computer system according to an embodiment of the present invention.

FIG. 1 describes a structure of a computer system according to an embodiment of the present invention, as shown in FIG. 1, which specifically includes:

A CPU101: A CPU (Central Processing Unit) mentioned in the embodiment of the present invention is a kind of processor, the processor may also be an ASIC (Application Specific Integrated Circuit), or other one or more integrated circuits configured to implement the embodiment of the present invention, and persons skilled in the art may understand that, other implementation manners of the processor may also be used to replace the CPU in the embodiment of the present invention.

A memory controller 102: A memory controller is an important component for controlling a memory module (or referred to as a memory) and exchanging data between the memory and the processor through the memory controller in a computer system. The memory controller decides important parameters, such as maximum memory capacity that can be used by the computer system, the number of memory BANKs, a memory type and speed, and a memory particle data depth and data width, that is to say, decides memory performance of the computer system, thereby greatly affecting the whole performance of the computer system. Currently, it is popular that a memory controller is embedded in a CPU, but it may also be that the memory controller and the CPU are implemented separately, and a connection form of the memory controller 102 and the CPU101 is not limited in the present invention.

A memory system 103: A memory system generally includes multiple memory modules (or referred to as memory chips), a memory module is a kind of hardware module that can implement a storage function, and one or more memory modules are connected to the memory controller through a memory channel, and then are connected to the CPU, so as to be accessed by the CPU. In the present invention, the memory module includes a DRAM memory module 104 and an NVM memory module 105, that is, the memory system 103 includes the DRAM memory module 104 and the NVM memory module 105.

The DRAM memory module 104: A DRAM is a most common memory chip, the DRAM can only keep data for a very short period, a charge of a DRAM chip gradually loses as time goes by, and in order to keep the data, the DRAM memory module uses capacitor to charge and is refreshed at intervals.

The NVM memory module 105: An NVM (Non-Volatile Memory, non-volatile memory) is another kind of storage particle that can be used as a memory chip, and different from a property of the DRAM, data stored in the NVM is not lost after shutdown or power down, for example, a to the working set to the NVM memory module. A method for determining the preset threshold of power consumption adjustment is: determining a ratio of performance to power consumption of the NVM memory module and a ratio of performance to power consumption of the DRAM memory module; determining an overhead for transferring the page data in the DRAM memory module and the NVM memory module and an overhead for updating a data location mapping table; and determining the preset threshold of power consumption adjustment according to the ratio of performance to power consumption of the NVM memory module, the ratio of performance to power consumption of the DRAM memory module, the overhead for transferring the page data in the DRAM memory module and the NVM memory module, the overhead for updating the data location mapping table, and a memory access requesting access mode.

Further, before the transferring, according to a size of a working set in the memory system, page data that does not belong to the working set to the NVM memory module, the method further includes:

dividing the DRAM memory module into a high-performance DRAM area and a low-power consumption DRAM area according to the size of the working set, where the high-performance DRAM area refers to a DRAM area that can be refreshed normally, and this part of area has larger power consumption but has higher performance, the low-power consumption DRAM area refers to a DRAM area in which a performance requirement is relatively lower, and power consumption of this part of area may be reduced by reducing refreshing; and transferring page data of the working set to the high-performance DRAM area.

Further, after the transferring, according to a size of a working set in the memory system, page data that does not belong to the working set to the NVM memory module, the method further includes:

recording a location mapping relationship of the page data that does not belong to the working set before and after the transferring in a data location mapping table, where the data location mapping table is used to record a location mapping relationship of data before and after the transferring.

In the embodiment of the present invention, when a DRAM memory module with a low access frequency exists in a memory system, page data that does not belong to a working set is transferred to an NVM memory module, and because the NVM memory module has characteristics of non-volatility and low power consumption, transferring a part of data stored in the DRAM memory module to the NVM memory module may reduce power consumption of the whole memory system. At the same time, a hybrid memory system based on a DRAM and an NVM is adopted, properties of different memory materials in the terms of performance and power PCM (Phase-Change Memory)-based PCRAM (Phase-Change Random Memory) technology, although its read-write speed is lower than that of the DRAM, it has characteristics of non-volatility and low power consumption.

Power consumption of the memory system is classified into static power consumption and dynamic power consumption in the terms of composition. The static power consumption refers to power consumption of a memory module in an idle situation, and mainly includes leakage power consumption, refresh power consumption, and the like. The dynamic power consumption refers to power consumption when the memory module is accessed, and includes power consumption of a memory chip, power consumption of a row buffer, power consumption of an I/O gating, and the like. Therefore, based on the characteristics of the DRAM memory module and the NVM memory module, the present invention proposes a hybrid memory system based on the DRAM memory module and the NVM memory module, and the hybrid memory system can effectively reduce the power consumption of the memory system while ensuring performance of the memory system.

Figure 2:
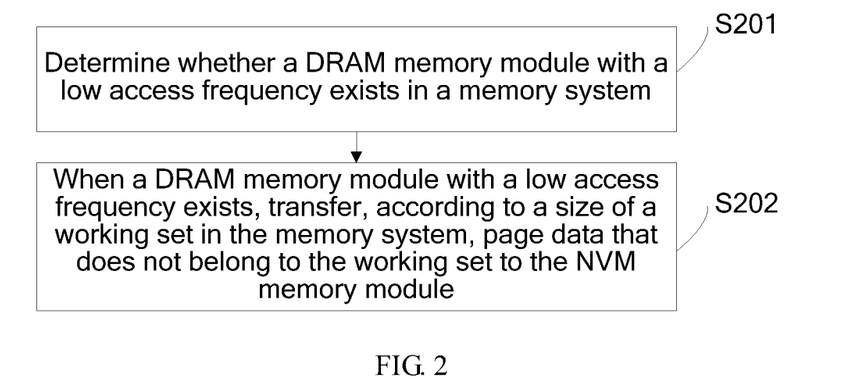
FIG. 2 is a flow chart of a method for reducing power consumption of a memory system according to an embodiment of the present invention.

FIG. 2 is a flow chart of a method for reducing power consumption of a memory system according to an embodiment of the present invention, and an executive body of this embodiment is a memory controller. As shown in FIG. 2, the method in this embodiment specifically includes:

S201: Determine whether a DRAM memory module with a low access frequency exists in a memory system.

Further, before the determining whether a DRAM memory module with a low access frequency exists in a memory system, the method further includes:

monitoring a use state of a memory module in the memory system, where the memory module includes an NVM memory module and a DRAM memory module, and the use state of the memory module includes whether the memory module is accessed and an accessed frequency; and the determining whether a DRAM memory module with a low access frequency exists in a memory system includes: determining, according to the accessed frequency, whether the DRAM memory module with a low access frequency exists in the memory system.

S202: When the DRAM memory module with a low access frequency exists, transfer, according to a size of a working set in the memory system, page data that does not belong to the working set to the NVM memory module, where the page data that does not belong to the working set is page data that does not need to be accessed when a process runs within preset time.

Specifically, the transferring, according to a size of a working set in the memory system, page data that does not belong to the working set to the NVM memory module includes:

when the size of the working set does not exceed a preset threshold of power consumption adjustment, transferring, by the memory controller, the page data that does not belong consumption may be comprehensively complementary, thereby reducing power consumption of the memory system to a maximum extent on the premise of satisfying performance of the memory system.

Figure 3:
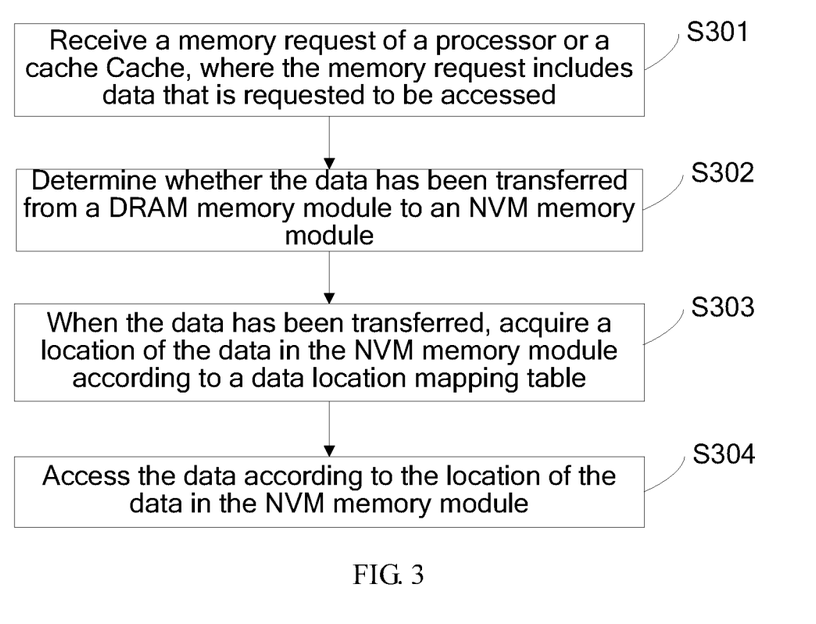
FIG. 3 is a flow chart of a method for accessing memory system data according to an embodiment of the present invention.

The power consumption of the memory system is reduced by adopting the hybrid memory system based on the DRAM and the NVM, a part of data in the DRAM memory module needs to be transferred to the NVM memory module, and therefore, when accessing the memory system of which the power consumption is reduced, the memory controller cannot directly access data in the DRAM memory module. FIG. 3 describes a method for accessing memory system data according to an embodiment of the present invention. The memory system is a hybrid memory system formed by a DRAM memory module and an NVM memory module, and an executive body of this embodiment is a memory controller; and specifically, the embodiment includes:

S301: Receive a memory access request of a processor or a cache, where the memory access request includes data that is requested to be accessed.

Further, after the receiving a memory access request of a processor or a cache Cache, the method further includes:

monitoring a use state of a memory module in the memory system, where the memory module includes the DRAM memory module and the NVM memory module, and the use state of the memory module includes whether the memory module is accessed and an accessed frequency; determining, according to the accessed frequency, whether a DRAM memory module with a low access frequency exists in the memory system; and when a DRAM memory module with a low access frequency exists, transferring data from the DRAM memory module to the NVM memory module.

Further, the transferring data from the DRAM memory module to the NVM memory module includes: transferring, according to a size of a working set in the memory system, page data that does not belong to the working set to the NVM memory module, where the page data that does not belong to the working set is page data that does not need to be accessed when a process runs within preset time.

S302: Determine whether the data has been transferred from the DRAM memory module to the NVM memory module.

S303: When the data has been transferred, acquire a location of the data in the NVM memory module according to a data location mapping table, where the data location mapping table is used to record a location mapping relationship of the data before and after the transferring.

S304: Access the data according to the location of the data in the NVM memory module.

Figure 4:
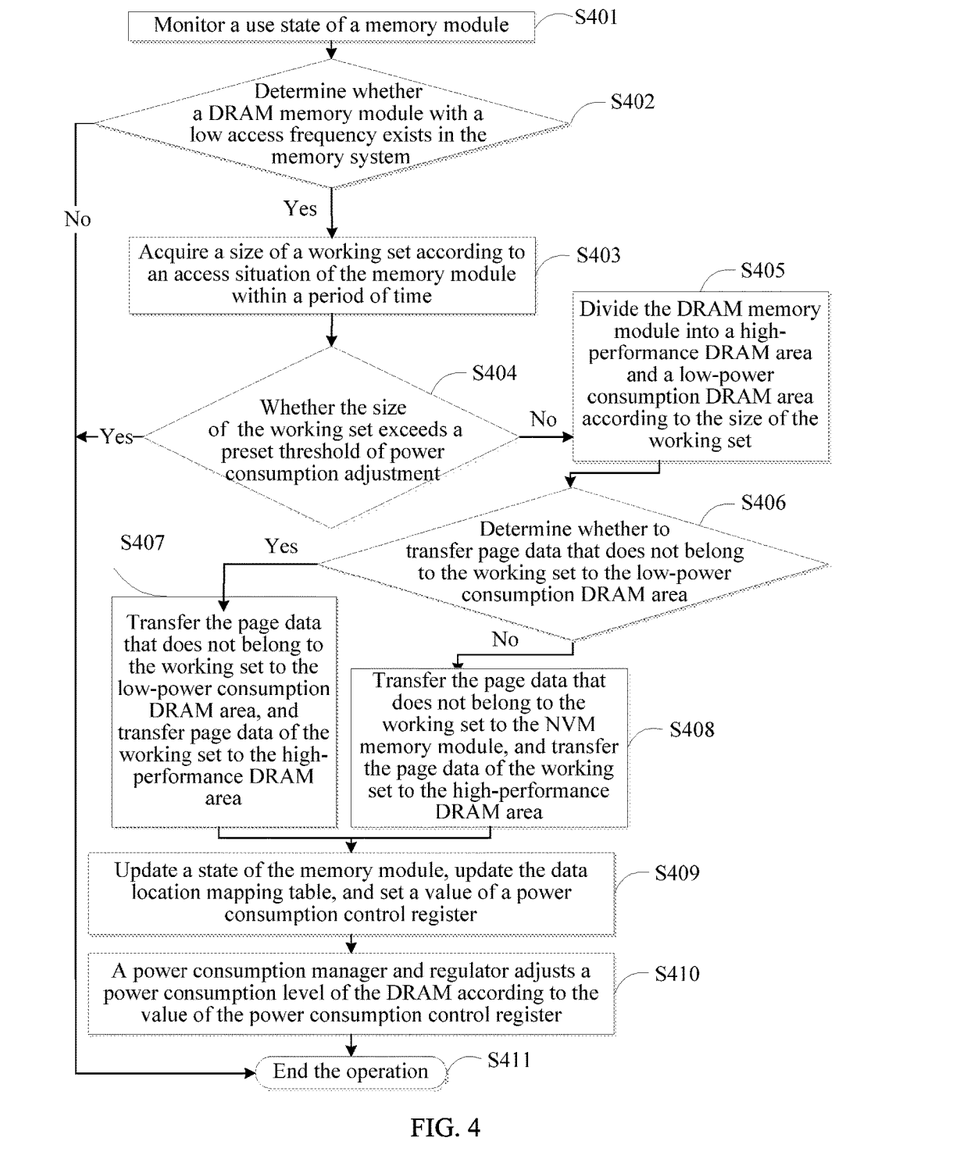
FIG. 4 is a flow chart of a procedure for reducing power consumption of a memory system according to an embodiment of the present invention.

The technical solution in the embodiment of the method for reducing power consumption of a memory system shown in FIG. 2 is described in detail in the following by adopting a specific embodiment. FIG. 4 is a schematic diagram of a procedure of reducing power consumption of a memory system according to an embodiment of the present invention, and specifically, the embodiment includes:

S401: Monitor a use state of a memory module.

Specifically, a memory module state monitor in a memory controller monitors a use state of a memory module in a memory system, where the memory module includes a DRAM memory module and an NVM memory module, and the use state of the memory module includes whether the memory module is accessed and an accessed frequency of the memory module within a period of time.

S402: Determine whether a DRAM memory module with a low access frequency exists in the memory system, and if yes, proceed to S403; otherwise, proceed to S411.

Specifically, the memory controller may determine, according to the accessed frequency of the memory module monitored by the memory module state monitor, whether the DRAM memory module with a low access frequency exists, and if no DRAM module with a low access frequency exists, that is, an accessed frequency of the DRAM memory module is relatively high, an operation of reducing memory power consumption is not implemented, and directly proceed to S411 to end the operation, because implementing an operation of reducing power consumption for a DRAM memory module with a high access frequency significantly affects performance.

S403: Acquire a size of a working set of the memory system according to an access situation of the memory module within a period of time.

Specifically, the memory controller may acquire, according to the access situation of the memory module within a period of time, page data with a high access frequency and page data with a low access frequency existing in the memory module within a recent period of time, where the page data with a high access frequency is active page data, and is page data that must be accessed when a process runs within the recent period of time, that is, page data of the working set; and the page data with a low access frequency is page data that is hardly being accessed, and is page data that does not need to be accessed when the process runs within the recent period of time, that is, page data that does not belong to the working set.

Therefore, the size of the working set, which is acquired by the memory controller, is a size of the page data of the working set.

S404: Determine whether the size of the working set exceeds a preset threshold of power consumption adjustment, and if yes, proceed to S411; otherwise, proceed to S405.

A method for determining the preset threshold of power consumption adjustment is: determining a ratio of performance to power consumption of the NVM memory module and a ratio of performance to power consumption of the DRAM memory module; determining an overhead for transferring the page data in the DRAM memory module and the NVM memory module, and an overhead for updating a data location mapping table; and determining the preset threshold of power consumption adjustment according to the ratio of performance to power consumption of the NVM memory module, the ratio of performance to power consumption of the DRAM memory module, the overhead for transferring the page data in the DRAM memory module and the NVM memory module, the overhead for updating the data location mapping table, and a memory access requesting access mode. Specifically, for a procedure of determining the preset threshold of power consumption adjustment, reference may be made to a procedure described in an embodiment shown in FIG. 5.

S405: Divide the DRAM memory module into a high-performance DRAM area and a low-power consumption DRAM area according to the size of the working set.

Specifically, because the page data of the working set needs to be accessed frequently and has a higher performance requirement, it needs to be stored in a DRAM area that can be refreshed normally, and in this part of DRAM area, although refresh power consumption cannot be reduced, performance is higher, and therefore, the area is referred to as a high-performance DRAM area; oppositely, because the page data that does not belong to the working set is not accessed frequently and has a lower performance requirement, it may be stored in a DRAM area that does not need to be refreshed normally, and in this part of DRAM area, although performance is lowered, refresh power consumption can be reduced, and therefore, the area is referred to as a low-power consumption DRAM area.

The memory controller may divide, according to the size of the working set, a high-performance DRAM area that is not less than the size of the working set, and the other DRAM area may be divided as a low-power consumption DRAM area.

It should be noted that, the present invention mainly applies transferring the page data of the working set to the high-performance DRAM area and transferring the page data that does not belong to the working set to the NVM memory module, and because the NVM memory module does not need to be refreshed, the transferring described in the foregoing may effectively reduce the power consumption of the memory system. However, the transferring the page data to the NVM memory module greatly affects performance of an application corresponding to the data in the NVM memory module, the transferring the page data that does not belong to the working set to the NVM memory module is not applicable to all practical applications, and therefore, in the present invention, the DRAM is divided into the high-performance DRAM area and the low-power consumption DRAM area, so as to cope with a situation in the practice that page data that does not belong to a working set may need to be transferred to a low-power consumption DRAM area.

S406: Determine whether to transfer the page data that does not belong to the working set to the low-power consumption DRAM area, and if yes, proceed to S407; otherwise, proceed to S408.

In the present invention, in consideration of a possible situation in a practical application, the following page data transferring policies are adopted to determine whether to transfer the page data that does not belong to the working set to the low-power consumption DRAM area:

(1) If an application is rather sensitive to a delay, that is, performance of the application is significantly deteriorated even a tiny delay is added, the page data that does not belong to the working set is not transferred from the DRAM memory module to the NVM memory module;

(2) If an application is not sensitive to a delay, that is, performance of the application is not significantly affected by adding a delay, the page data that does not belong to the working set is transferred from the DRAM memory module to the NVM memory module, so as to reduce power consumption; and (3) If an application has general sensitiveness to a delay, for example, performance of the application is affected when a delay is increased to a certain value A, and a performance overhead of the NVM memory module need to be considered. If a performance overhead, that is, a delay overhead of the NVM memory module is very large and exceeds A when being compared with a memory module in the low-power consumption DRAM area, data of the DRAM memory module cannot be transferred to the NVM memory module.

If the performance overhead of the NVM memory module does not exceed A when being compared with the memory module in the low-power consumption DRAM area, the data of the DRAM memory module can be transferred to the NVM memory module.

S407: Transfer the page data that does not belong to the working set to the low-power consumption DRAM area, and transfer the page data of the working set to the high-performance DRAM area.

S408: Transfer the page data that does not belong to the working set to the NVM memory module, and transfer the page data of the working set to the high-performance DRAM area.

S409: Update a state of the memory module, update the data location mapping table, and set a value of a power consumption control register.

The memory controller updates the data location mapping table, and records, in the data location mapping table, a location mapping relationship of the page data transferred from the DRAM memory module to the high-performance DRAM area, the low-power consumption DRAM area, or the NVM memory module.

Moreover, if the executed step is S407, that is, the page data that does not belong to the working set is transferred to the low-power consumption DRAM area, the value of the power consumption control register needs to be set, so as to be convenient for a power consumption manager and regulator to adjust power consumption of the low-power consumption DRAM area according to the set value of the power consumption control register, thereby adjusting the low-power consumption DRAM area to a low-power consumption state.

It should be noted that, the power consumption control register is located in the memory controller; the power consumption manager and regulator is located outside the memory controller, and is used to be responsible for adjusting power consumption of the DRAM memory module, for example, adjusting a running frequency, a running voltage, or a refresh frequency of the DRAM memory module. The power consumption control register sends a command for adjusting the power consumption of the DRAM memory module to the power consumption manager and regulator, for example, a PASR (Partial Array Self Refresh, partial array self refresh) command S410: The power consumption manager and regulator adjusts a power consumption level of the DRAM according to the value of the power consumption control register.

Specifically, the power consumption manager and regulator reduces the power consumption of the DRAM according to the value of the power consumption control register, which may be implemented by using a DVFS (Dynamic Voltage and Frequency Scaling, dynamic voltage and frequency scaling) or DFS (Dynamic Frequency Scaling, dynamic frequency scaling) technology.

Step 411: End the operation, that is, end one cycle of adjusting the power consumption of the memory system.

Figure 5:
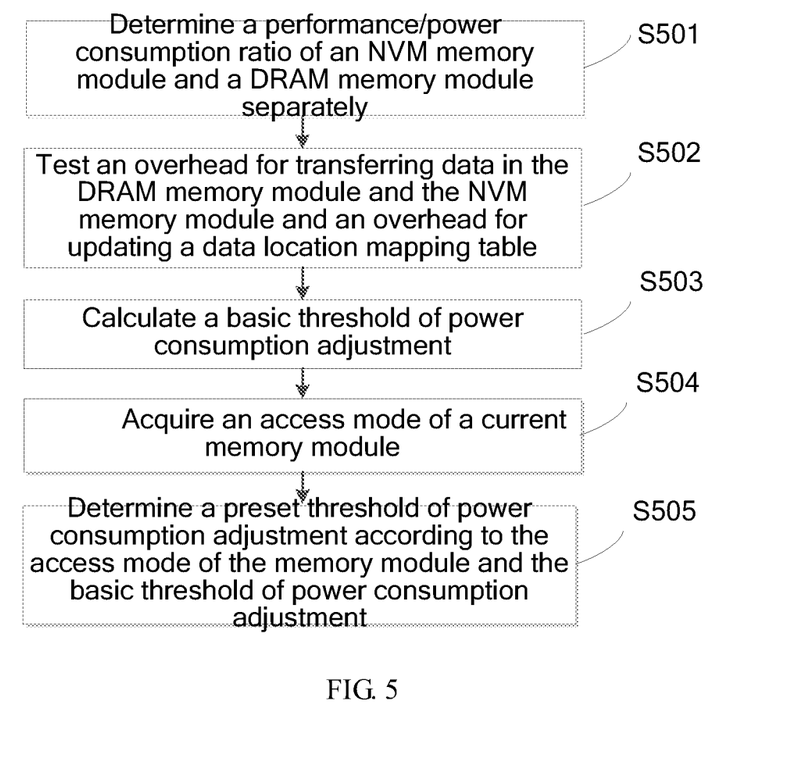
FIG. 5 is a flow chart of a method for determining a preset threshold of power consumption adjustment according to an embodiment of the present invention.

FIG. 5 shows a method for determining a preset threshold of power consumption adjustment according to an embodiment of the present invention, which specifically includes:

S501: Determine a performance/power consumption ratio of an NVM memory module and a DRAM memory module separately.

S502: Test an overhead for transferring data in the DRAM memory module and the NVM memory module and an overhead for updating a data location mapping table.

S503: Calculate a basic threshold of power consumption adjustment.

Specifically, the basic threshold of power consumption adjustment is determined according to the ratio of performance to power consumption of the NVM memory module, the ratio of performance to power consumption of the DRAM memory module, the overhead for transferring the data in the DRAM memory module and the NVM memory module, and the overhead for updating the data location mapping table.

S504: Acquire an access mode of a current memory module.

Specifically, a memory module state monitor monitors a state of the memory module, including an accessed mode of the memory module, and therefore, the accessed mode of the current memory module may be acquired by checking the memory module state monitor. The accessed mode includes multiple kinds of access modes such as stream accessed and repeated accessed.

S505: Determine a preset threshold of power consumption adjustment according to the access mode of the memory module and the basic threshold of power consumption adjustment.

Each access mode has a different requirement on performance for requesting memory access, and therefore, a corresponding preset threshold of power consumption adjustment needs to be calculated for a different access mode. For example, a stream access mode is inferior to a repeat access mode in the terms of delay sensitiveness, and a threshold of power consumption adjustment may be reduced appropriately for the stream access mode, thereby performing adjustment of power consumption as early as possible.

Therefore, the threshold of power consumption adjustment in a different access mode is adjusted according to the basic threshold of power consumption adjustment, so as to finally determine the threshold of power consumption adjustment in a different access mode, that is, the preset threshold of power consumption, and the preset threshold of power consumption indicates when the adjustment of power consumption of the memory system needs to be performed.

In the embodiment of the present invention, when it is determined that a DRAM memory module with a low access frequency exists in a memory system, page data that does not belong to a working set is transferred to an NVM memory module, and because the NVM memory module has characteristics of non-volatility and low power consumption, transferring a part of data stored in the DRAM memory module to the NVM memory module may reduce power consumption of the whole memory system. At the same time, a hybrid memory system based on a DRAM and an NVM is adopted, properties of different memory materials in the terms of performance and power consumption may be comprehensively complementary, thereby reducing power consumption of the memory system to a maximum extent on the premise of satisfying performance of the memory system.

Figure 6:
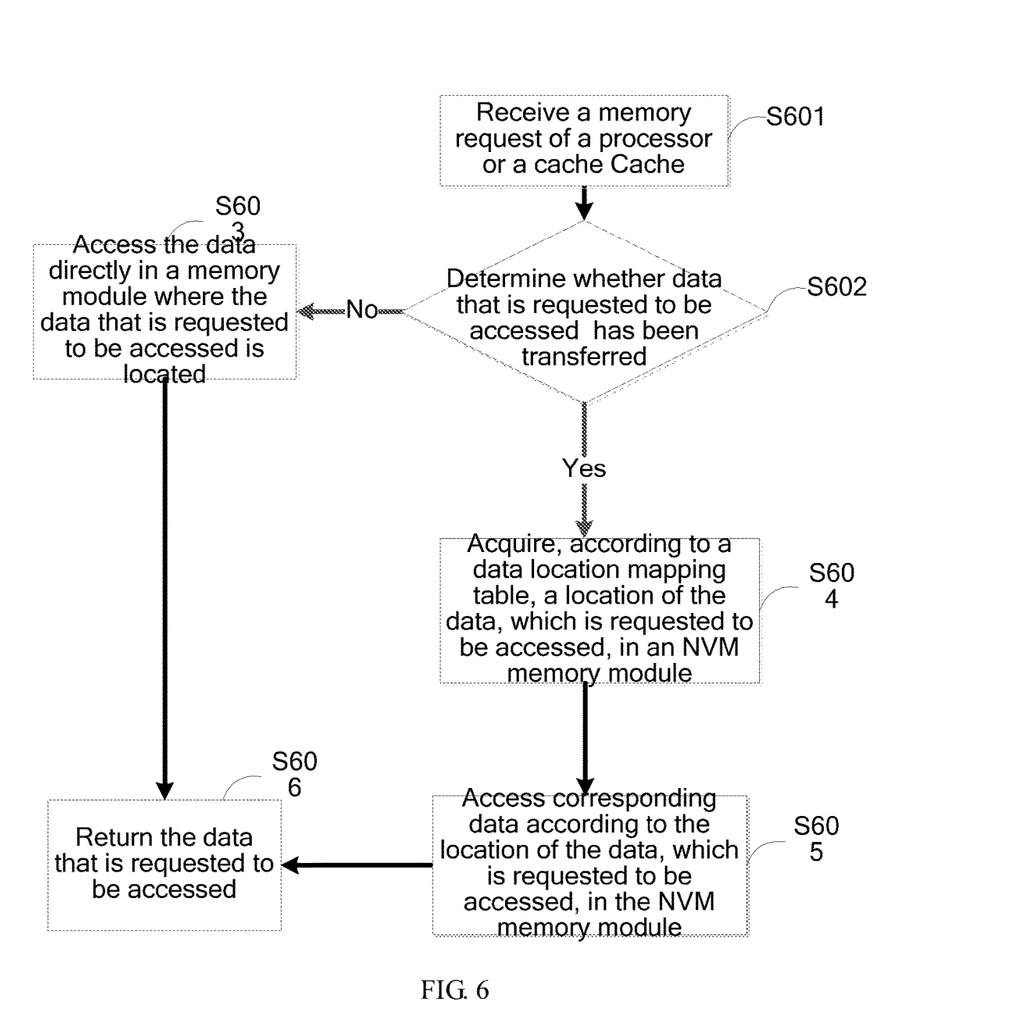
FIG. 6 is a flow chart of a procedure for accessing memory system data according to an embodiment of the present invention.

A method embodiment of the method for accessing memory system data shown in FIG. 3 is described in detail in the following by adopting a specific embodiment. FIG. 6 is a schematic diagram of a procedure of accessing memory system data according to an embodiment of the present invention, and its executive body is a memory controller. A specific procedure is shown in FIG. 6, and includes:

S601: Receive a memory access request of a processor or a cache, where the memory access request includes data that is requested to be accessed.

S602: Determine whether the data that is requested to be accessed has been transferred, and if yes, proceed to S604; otherwise, proceed to S603.

Specifically, a data location mapping table records a location mapping of data transferring between a DRAM memory module and an NVM memory module, that is, records whether the data has been transferred from the DRAM memory module to the NVM memory module, so that the memory controller may acquire, by querying the data location mapping table, whether the data that is requested to be accessed has been transferred.

S603: Access the data directly in a memory module where the data that is requested to be accessed is located.

S604: Acquire, according to the data location mapping table, a location of the data, which is requested to be accessed, in the NVM memory module.

S605: Access corresponding data according to the location of the data, which is requested to be accessed, in the NVM memory module.

S606: Return the data that is requested to be accessed.

Further, after step S601, the procedure further includes:

monitoring a use state of a memory module in a memory system, where the memory module includes the DRAM memory module and the NVM memory module, and the use state of the memory module includes whether the memory module is accessed and an accessed frequency; determining, according to the accessed frequency, whether a DRAM memory module with a low access frequency exists in the memory system; when a DRAM memory module with a low access frequency exists, transferring the data from the DRAM memory module to the NVM memory module, which specifically includes: transferring, according to a size of a working set in the memory system, page data that does not belong to the working set to the NVM memory module, where the page data that does not belong to the working set is page data that does not to be accessed when a process runs within preset time.

Considering that in a practical application, a memory access mode of an application changes with a stage, and few data is accessed by the application in a period of time, the memory controller switches the memory system to a low-power consumption state by adjusting power consumption of the memory system, thereby reducing the power consumption of the whole memory system; however, if data amount accessed by the application increases in a next period of time, the memory controller needs to restore the memory system from the low-power consumption state to a high-performance state, so as to improve performance of the whole memory system.

Figure 7:
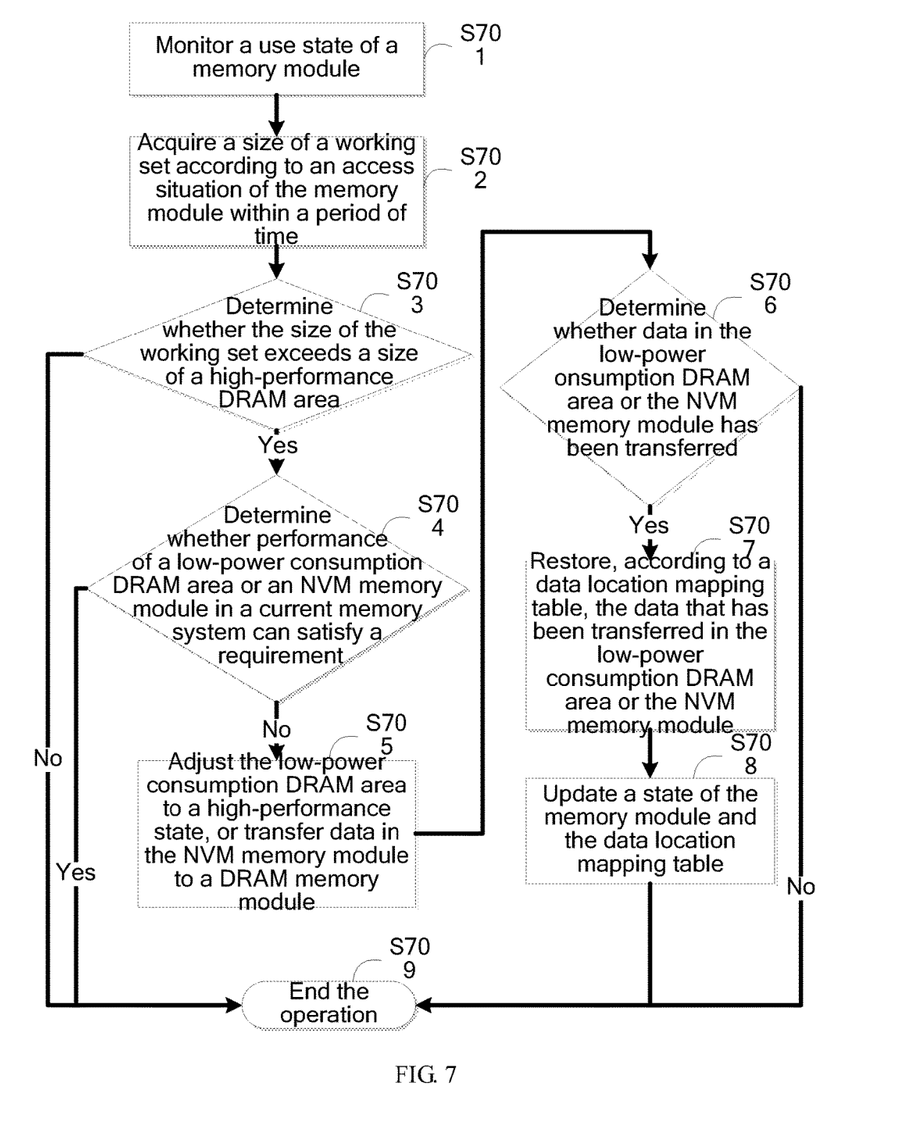
FIG. 7 is a flow chart of a method for restoring a memory system from a low-power consumption state to a high-performance state according to an embodiment of the present invention.

FIG. 7 describes a method for restoring a memory system from a low-power consumption state to a high-performance state according to an embodiment of the present invention, which specifically includes:

S701: Monitor a use state of a memory module.

S702: Acquire a size of a working set according to an access situation of the memory module within a period of time.

S703: Determine whether the size of the working set exceeds a size of a high-performance DRAM area, and if yes, proceed to S704; otherwise, proceed to step 709.

S704: Determine whether performance of a low-power consumption DRAM area or an NVM memory module in a current memory system can satisfy a requirement, and if yes, proceed to step 709; otherwise, proceed to step 705.

S705: Adjust the low-power consumption DRAM area to a high-performance state, or, transfer data in the NVM memory module to a DRAM memory module.

706: Determine whether data in the low-power consumption DRAM area or the NVM memory module has been transferred, and if yes, proceed to S707; otherwise, proceed to S709.

S707: Restore, according to a data location mapping table, the data that has been transferred in the low-power consumption DRAM area or the NVM memory module.

S708: Update a state of the memory module and the data location mapping table.

S709: End the operation.

Figure 8:
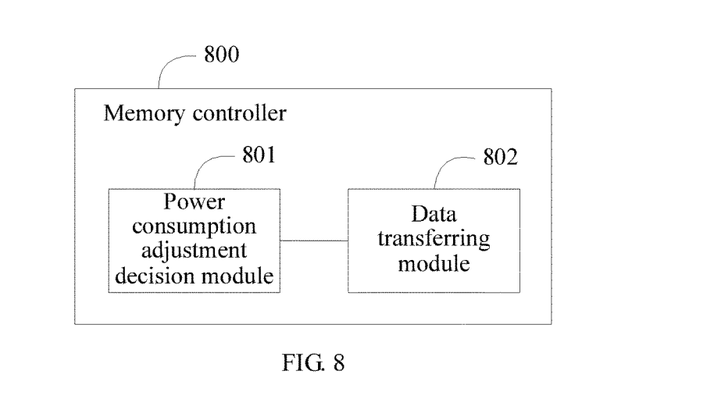
FIG. 8 is a structural diagram of a memory controller according to an embodiment of the present invention.

FIG. 8 describes a schematic structural diagram of a memory controller 800 according to an embodiment of the present invention, as shown in FIG. 8, the memory controller 800 includes a power consumption adjustment decision module 801 and a data transferring module 802, and specifically:

The power consumption adjustment decision module 801 is configured to determine whether a DRAM memory module with a low access frequency exists in a memory system.

The data transferring module 802 is configured to, when the power consumption adjustment decision module 801 determines that a DRAM memory module with a low access frequency exists, transfer, according to a size of a working set in the memory system, page data that does not belong to the working set to a non-volatile memory NVM memory module, where the page data that does not belong to the working set is page data that does not need to be accessed when a process runs within preset time.

Further, the data transferring module 802 is specifically configured to: when the size of the working set does not exceed a preset threshold of power consumption adjustment, transfer the page data that does not belong to the working set to the NVM memory module.

The memory controller 800 in this embodiment may be configured to execute the technical solutions in the method embodiments shown in FIG. 2 and FIG. 4, an implementation principle and technical effect thereof are similar, which are not repeated herein.

Figure 9:
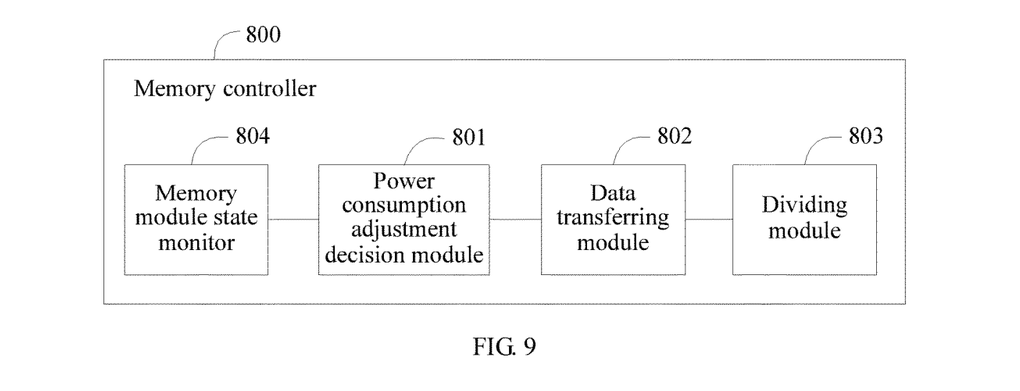
FIG. 9 is a structural diagram of a memory controller according to another embodiment of the present invention.

FIG. 9 describes a schematic structural diagram of a memory controller 800 according to another embodiment of the present invention, the memory controller 800 in this embodiment is on the basis of the embodiment shown in FIG. 8, and further, the memory controller 800 further includes a dividing module 803 and a memory module state monitor 804, and specifically, The dividing module 803 is configured to divide a DRAM memory module into a high-performance DRAM area and a low-power consumption DRAM area according to the size of the working set; and at this time, the data transferring module 802 is further configured to transfer page data of the working set to the high-performance DRAM area.

The memory module state monitor 804 is configured to monitor a use state of a memory module in the memory system, where the memory module includes the DRAM memory module and the NVM memory module, and the use state of the memory module includes whether the memory module is accessed and an accessed frequency; and the power consumption adjustment decision module 801 is specifically configured to determine, according to the accessed frequency, whether the DRAM memory module with a low access frequency exists in the memory system.

The memory controller 800 in this embodiment may be configured to execute the technical solutions in the method embodiments shown in FIG. 2 and FIG. 4, an implementation principle and technical effect thereof are similar, which are not repeated herein.

With the memory controller provided in the embodiment of the present invention, when a DRAM memory module with a low access frequency exists in a memory system, page data that does not belong to a working set is transferred to an NVM memory module, and because the NVM memory module has characteristics of non-volatility and low power consumption, transferring a part of data stored in the DRAM memory module to the NVM memory module may reduce power consumption of the whole memory system. At the same time, a hybrid memory system based on a DRAM and an NVM is adopted, properties of different memory materials in the terms of performance and power consumption may be comprehensively complementary, thereby reducing power consumption of the memory system to a maximum extent on the premise of satisfying performance of the memory system.

Figure 10:
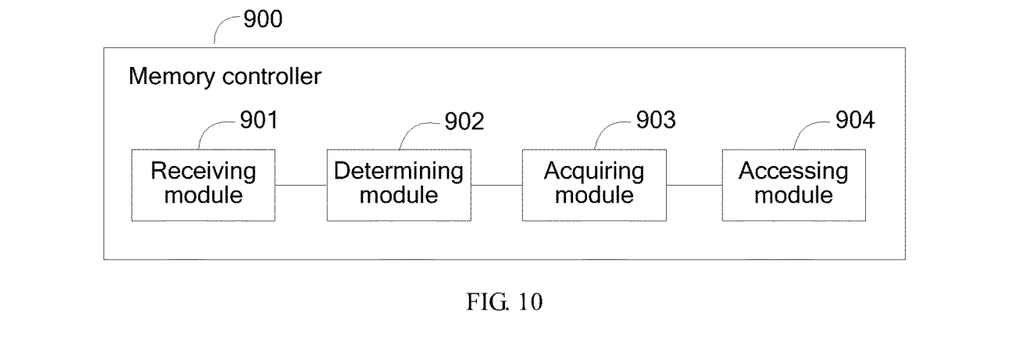
FIG. 10 is a structural diagram of a memory controller according to another embodiment of the present invention.

FIG. 10 describes a schematic structural diagram of a memory controller 900 according to an embodiment of the present invention, as shown in FIG. 10, the memory controller 900 includes a receiving module 901, a determining module 902, an acquiring module 903, and an accessing module 904, and specifically:

The receiving module 901 is configured to receive a memory access request of a processor or a cache, where the memory access request includes data that is requested to be accessed.

The determining module 902 is configured to determine whether the data has been transferred from a DRAM memory module to an NVM memory module.

The acquiring module 903 is configured to, when the determining module 902 determines that the data has been transferred, acquire a location of the data in the NVM memory module according to a data location mapping table, where the data location mapping table is used to record a location mapping relationship of the data before and after the transferring.

The accessing module 904 is configured to access the data according to the location of the data in the NVM memory module.

The memory controller 900 in this embodiment may be configured to execute the technical solutions in the method embodiments shown in FIG. 3 and FIG. 6, an implementation principle and technical effect thereof are similar, which are not repeated herein.

Figure 11:
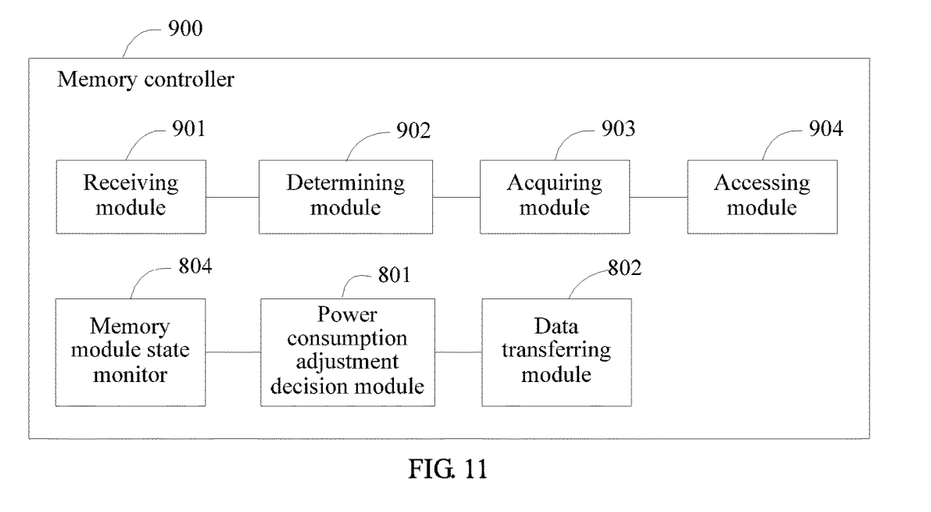
FIG. 11 is a structural diagram of a memory controller according to another embodiment of the present invention.

FIG. 11 describes a schematic structural diagram of a memory controller 900 according to another embodiment of the present invention, the memory controller 900 in this embodiment is on the basis of the embodiment shown in FIG. 10, and further, the memory controller 900 further includes a memory module state monitor 804, a power consumption adjustment decision module 801, and a data transferring module 802, and specifically, The memory module state monitor 804 is configured to monitor a use state of a memory module in the memory system, where the memory module includes the DRAM memory module and the NVM memory module, and the use state of the memory module includes whether the memory module is accessed and an accessed frequency.

The power consumption adjustment decision module 801 is configured to determine, according to the accessed frequency, whether a DRAM memory module with a low access frequency exists in the memory system.

The data transferring module 802 is configured to, when the power consumption adjustment decision module 801 determines that a DRAM memory module with a low access frequency exists, transfer data from the DRAM memory module to the NVM memory module, where the transferring the data from the DRAM memory module to the NVM memory module includes: transferring, according to a size of a working set in the memory system, page data that does not belong to the working set to the NVM memory module, where the page data that does not belong to the working set is page data that does not need to be accessed when a process runs within preset time.

The memory controller 900 in this embodiment may be configured to execute the technical solutions in the method embodiments shown in FIG. 3 and FIG. 6, an implementation principle and technical effect thereof are similar, which are not repeated herein.

With the memory controller provided in the embodiment of the present invention, when a DRAM memory module with a low access frequency exists in a memory system, page data that does not belong to a working set is transferred to an NVM memory module, and because the NVM memory module has characteristics of non-volatility and low power consumption, transferring a part of data stored in the DRAM memory module to the NVM memory module may reduce power consumption of the whole memory system. At the same time, a hybrid memory system based on a DRAM and an NVM is adopted, properties of different memory materials in the terms of performance and power consumption may be comprehensively complementary, thereby reducing power consumption of the memory system to a maximum extent on the premise of satisfying performance of the memory system.

Figure 12:
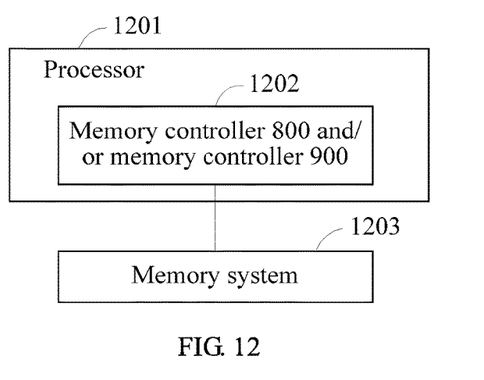
FIG. 12 is a structural diagram of a computer system according to another embodiment of the present invention.

FIG. 12 describes a structure of a computer system according to another embodiment of the present invention, which includes at least one processor 1201, at least one memory controller 1202, and a memory system 1203, where the processor 1201 may be a CPU, an ASIC, or the like; the memory controller 1202 is the memory controller 800 and/or the memory controller 900 provided in the foregoing embodiments; and the memory system 1203 is a hybrid memory system, including a DRAM memory module and an NVM memory module.

Persons of ordinary skill in the art may understand that all or a part of the steps of the foregoing method embodiments may be implemented by a program instructing relevant hardware. The foregoing program may be stored in a computer readable storage medium. When the program is run, the steps of the foregoing method embodiments are performed. The foregoing storage medium may be any medium that is capable of storing program codes, such as a ROM, a RAM, a magnetic disk, or an optical disk.

Finally, it should be noted that the foregoing embodiments are merely intended for describing the technical solutions of the present invention rather than limiting the present invention. Although the present invention is described in detail with reference to the foregoing embodiments, persons of ordinary skill in the art should understand that they may still make modifications to the technical solutions described in the foregoing embodiments, or make equivalent replacements to some or all the technical features thereof; however, these modifications or replacements do not make the essence of corresponding technical solutions depart from the scope of the technical solutions in the embodiments of the present invention.

What is claimed is:
1. A method for reducing power consumption of a memory system, wherein the memory system comprises a dynamic random access memory DRAM memory module and a non-volatile memory NVM memory module, and the method comprises:
 monitoring a use state of the DRAM memory module, wherein the use state of the DRAM memory module comprises an accessed frequency of the DRAM memory module; and
 transferring page data that does not belong to a working set in the DRAM memory module to the NVM memory module when the access frequency of the DRAM memory module is lower than a preset threshold, wherein the page data that does not belong to the working set in the DRAM memory module is the page data that does not need to be accessed by a process when the process runs in a preset period.

2. The method according to claim 1, wherein the method further comprises:
 dividing the DRAM memory module into a first DRAM area and a second DRAM area, wherein the first DRAM area is a DRAM area that needs to be refreshed at a normal rate, and the second DRAM area is an area in the DRAM memory module that needs to be refreshed at a rate lower than the normal rate; and
 transferring page data of the working set in the second DRAM area to the first DRAM area, wherein the page data of the working set in the second DRAM memory area is the page data that need to be accessed by the process when the process runs in the preset period.

3. The method according to claim 1, further comprising:
 recording a location mapping relationship of the page data that does not belong to the working set before and after the transferring in a data location mapping table.

4. The method according to claim 2, further comprising:
 recording a location mapping relationship of the page data that does not belong to the working set before and after the transferring in a data location mapping table.

5. A memory controller connected to a memory system, wherein the memory system comprises a DRAM memory module and an NVM memory module, and the memory controller is configured to:
 monitor a use state of a DRAM memory module, wherein the use state of the DRAM memory module comprises an accessed frequency of the DRAM memory module; and
 transfer page data that does not belong to a working set in the DRAM memory module to the NVM memory module when the access frequency of the DRAM memory module is lower than a preset threshold, wherein the page data that does not belong to the working set in the DRAM memory module is page data that does not need to be accessed by a process when the process runs in a preset period.

6. The memory controller according to claim 5, the memory controller is further configured to:
 divide the DRAM memory module into a first DRAM area and a second DRAM area, wherein the first DRAM area is a DRAM area that needs to be refreshed at a normal rate, and the second DRAM area is an area in the DRAM memory module that needs to be refreshed at a rate lower than the normal rate; and
 transfer page data of the working set in the second DRAM area to the first DRAM area, wherein the page data of the working set in the second DRAM memory area is the page data that need to be accessed by the process when the process runs in the preset period.

7. The memory controller according to claim 5, the memory controller is further configured to:
 record a location mapping relationship of the page data that does not belong to the working set before and after the transferring in a data location mapping table.

8. The memory controller according to claim 6, the memory controller is further configured to:
 record a location mapping relationship of the page data that does not belong to the working set before and after the transferring in a data location mapping table.

9. A computer system, comprising: a memory controller and a memory system coupled to the memory controller, wherein the memory system comprises a DRAM memory module and an NVM memory module, and wherein the memory controller is configured to:
 monitor a use state of the DRAM memory module, wherein the use state of the DRAM memory module comprises an accessed frequency of the DRAM memory module; and
 transfer page data that does not belong to a working set in the DRAM memory module to the NVM memory module when the access frequency of the DRAM memory module is lower than a preset threshold, wherein the page data that does not belong to the working set in the DRAM memory module is page data that does not need to be accessed by a process when the process runs in a preset period.

10. The computer system according to claim 9, wherein the memory controller is further configured to:
 divide the DRAM memory module into a first DRAM area and a second DRAM area, wherein the first DRAM area is a DRAM area that needs to be refreshed at a normal rate, and the second DRAM area is an area in the DRAM memory module that needs to be refreshed at a rate lower than the normal rate; and
 transfer page data of the working set in the second DRAM area to the first DRAM area wherein the page data of the working set in the second DRAM memory area is the page data that need to be accessed by the process when the process runs in the preset period.

11. The computer system according to claim 9, wherein the memory controller is further configured to:
 record a location mapping relationship of the page data that does not belong to the working set before and after the transferring in a data location mapping table.

12. A processor, comprising:
 at least one processor core;
 a memory controller coupled to the at least one processor core and a memory system, wherein the memory controller is configured to:
 monitor a use state of a DRAM memory module in the memory system, wherein the use state of the DRAM memory module in the memory system comprises an accessed frequency of the DRAM memory module; and
 transfer page data that does not belong to a working set in the DRAM memory module to an NVM memory module in the memory system when the access frequency of the DRAM memory module is lower than a preset threshold, wherein the page data that does not belong to the working set in the DRAM memory module is page data that does not need to be accessed by a process when the process runs in a preset period.

13. The processor according to claim 12, wherein the memory controller is further configured to:
 divide the DRAM memory module into a first DRAM area and a second DRAM area, wherein the first DRAM area is a DRAM area that needs to be refreshed at a normal rate, and the second DRAM area is an area in the DRAM memory module that needs to be refreshed at a rate lower than the normal rate; and transfer page data of the working set in the second DRAM area to the first DRAM area, wherein the page data of the working set in the second DRAM memory area is the page data that need to be accessed by the process when the process runs in the preset period.

14. The processor according to claim 12, wherein the memory controller is further configured to:

record a location mapping relationship of the page data that does not belong to the working set before and after the transferring in a data location mapping table.

* * * * *